UNITED STATES PATENT OFFICE.

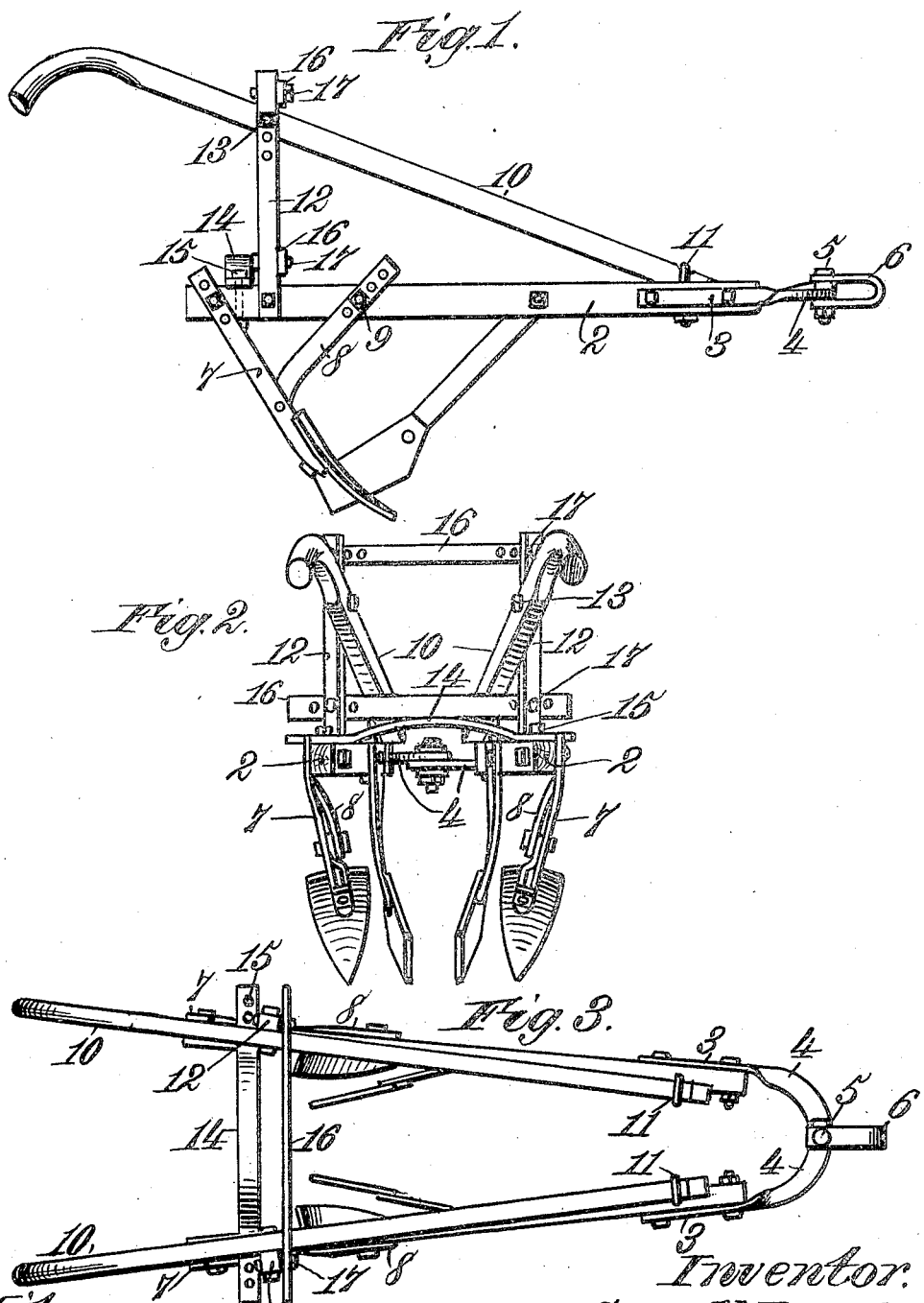

CASWELL PRESSLER, OF PLEASANTGROVE, MISSISSIPPI.

CULTIVATOR.

No. 812,678.     Specification of Letters Patent.     Patented Feb. 13, 1906.

Application filed July 13, 1905. Serial No. 269,517.

*To all whom it may concern:*

Be it known that I, CASWELL PRESSLER, a citizen of the United States, residing at Pleasantgrove, in the county of Panola and State of Mississippi, have invented new and useful Improvements in Cultivators, of which the following is a specification.

This invention relates to cultivators of substantially the same general type as that disclosed in Letters Patent of the United States to G. L. Wallace, No. 723,190, of March 17, 1903, to which reference may be had.

The present invention involves a structure possessing all the advantages of the patented structure and certain additional advantages, one of which is a maximum degree of strength without affecting the lateral adjustability of the beams or the vertical adjustability of the handles associated with said beams.

In the drawings accompanying and forming a part of this specification I show a simple form of embodiment including the invention, which, to enable those skilled in the art to practice said invention, I will describe in detail in the following description, while the novelty thereof will be included in the claims succeeding said description.

In the drawings, Figure 1 is a side elevation, Fig. 2 a rear elevation, and Fig. 3 a top plan view, of a cultivator involving my invention.

Like characters refer to like parts throughout the views.

The cultivator includes in its construction two beams 2 of duplicate make, which diverge from each other toward the rear of the cultivator, said beams being connected at their forward ends in such manner as to provide for their lateral adjustment either toward or from each other. I will now describe the connecting means shown between the two beams.

Each beam has fastened to its side face, near the forward end thereof, a strap, as 3, twisted on itself between its ends and curved inward to present horizontal portions, the curved horizontal portions being denoted by 4 and one of them overlapping the other. Extending through the terminals of the curved portions of the straps is a pivot-bolt, as 5, which also extends through the branches of a clevis, as 6, which may be of the usual construction. The straps may be rigidly attached to the beams in any desirable way—say by bolts.

The plow or shovel standards are designated by 7, and to them are connected braces, as 8, which are adjustably connected with the beams—say by means of several perforations in each brace, through one of which is adapted to pass a bolt or equivalent pin, as 9. In front of the plow-shovels are the usual fenders, the shanks of which may be riveted or otherwise fastened to the beams.

The handles are denoted by 10, and they are connected to the forward upper sides of the beams by hook-bolts, as 11, the hooks of the bolts fitting in notches in the forward ends of the handles and the shanks of the bolts extending through perforations in the beams and carrying nuts at their lower ends. The hook-bolts provide a simple means for connecting the handles with the standards and at the same time permit free tipping of the handles for adjustment.

Bolted or otherwise suitably fastened to the beams 2 near their rear ends are uprights, as 12, said uprights being in the present instance upon the outer faces of the beams and being adjustably connected near their upper ends with the handles 10, as will now appear, whereby said handles may be raised or lowered. I have shown each upright 12 as having a vertically-disposed row of perforations, through one of which a bolt, as 13, can extend, said bolt also extending through a perforation in the adjacent handle. By removing the bolt and putting it into another perforation than that it may occupy the handle may be vertically adjusted. In adjusting the handles both, of course, will be manipulated, and in practice a sufficient number of perforations to receive the bolts 13 will be provided to secure a wide range of adjustment of the handles.

Bolted or otherwise attached to the upper sides of the beams 2 near their rear ends is a brace, as 14, upwardly arched and adjustably connected near its ends with said beams, which adjustable connections may consist of perforations and bolts, as 15. The brace 14, by reason of its adjustable connection with the beams, not only strengthens them materially laterally, but also provides for their adjustment either toward or from each other.

Extending between and fastened to the uprights 12 are braces, as 16, which fit squarely against the forward faces of said uprights and are adjustably connected thereto at their opposite ends, so as to adapt said braces to the different adjustments of the beams. Each brace 16 has near its opposite ends a longitudinal row of perforations to receive bolts, as 17, extending through the uprights at vertically-separated points. I therefore provide a structure that possesses unusual strength. It is really a square frame, the corner-joints of which are rigidly maintained, but in such a way as to provide for adjustment.

Having thus described my invention, what I claim is—

1. In a cultivator, beams, each having a strap fastened thereto at the forward end thereof, the straps being forwardly and inwardly curved and one overlapping the other, a pivot-bolt to extend through the overlapped portions of the straps, whereby the beams can be adjusted toward and from each other, and means for maintaining the adjustment of the beams.

2. In a cultivator, the combination of two beams converging toward straps fastened to the forward ends of the beams and overlapping each other at a point beyond the forward ends of the beam, a pivot-bolt extending through the overlapped portions of the straps to provide for adjustment of the beams toward and from each other, uprights rigidly fastened to and rising from the beams, handles supported for rocking motion by the beams, bolts to connect the uprights with the respective handles, each upright having several superposed perforations to receive the bolts, a brace situated above the handles and having perforations at its opposite ends, bolts supported by the uprights and adapted to extend through the last-mentioned perforations to adjustably connect said brace with the uprights, a second brace having perforations at its opposite ends, and a second pair of bolts to extend through the last-mentioned perforations to adjustably connect the last-mentioned brace with the uprights.

In testimony whereof I have hereunto set my hand in presence of two subscribing witnesses.

CASWELL PRESSLER.

Witnesses:
W. H. WALL,
E. FRIEND.